(12) United States Patent
Takasaki (10) Patent No.: US 7,780,563 B2
(45) Date of Patent: Aug. 24, 2010

(54) DRIVE FORCE DISTRIBUTION APPARATUS

(75) Inventor: Toshiharu Takasaki, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 395 days.

(21) Appl. No.: 11/684,310

(22) Filed: Mar. 9, 2007

(65) Prior Publication Data

US 2007/0213162 A1   Sep. 13, 2007

(30) Foreign Application Priority Data

Mar. 10, 2006   (JP)   ............................. 2006-066008
Mar. 15, 2006   (JP)   ............................. 2006-071249
Feb. 6, 2007    (JP)   ............................. 2007-027057

(51) Int. Cl.
    *F16H 37/02*   (2006.01)
(52) U.S. Cl. ......................................... 475/6; 475/150
(58) Field of Classification Search ...................... 475/6, 475/150; *F16H 48/02*
    See application file for complete search history.

(56) References Cited

U.S. PATENT DOCUMENTS

| 3,263,946 | A  | * | 8/1966 | Roberts et al. | .............. | 244/213 |
| 5,006,101 | A  |   | 4/1991 | Truong |  |  |
| 6,206,798 | B1 | * | 3/2001 | Johnson | ......................... | 475/6 |
| 7,500,933 | B2 | * | 3/2009 | Baasch et al. | ............... | 475/205 |
| 2001/0008859 | A1 | * | 7/2001 | Masaki | .......................... | 475/5 |
| 2004/0220011 | A1 | * | 11/2004 | Gumpoltsberger et al. | .. | 475/205 |
| 2005/0252707 | A1 |   | 11/2005 | Bowen |  |  |
| 2006/0025267 | A1 | * | 2/2006 | Gradu | ........................... | 475/6 |

FOREIGN PATENT DOCUMENTS

| EP | 1533166 A2 | 5/2005 |
| JP | 2004-505216 | 2/2004 |
| WO | WO-2005-110790 A2 | 11/2005 |

OTHER PUBLICATIONS

Japan Automobile Maintenance Colleges Association, ed. *Shashi no Kouzou* [Chassis Structure], Sankaido (Ltd.), Mar. 25, 1990, p. 95, Figs. 2-156.

* cited by examiner

*Primary Examiner*—David D Le
*Assistant Examiner*—Justin Holmes
(74) *Attorney, Agent, or Firm*—Global IP Counselors, LLP (57) ABSTRACT

A drive force distribution apparatus is provided with an input shaft, first and second output shafts, a first epicyclic gear group, a second epicyclic gear group and a motor/generator. The first epicyclic gear group has two degrees of freedom, with the first epicyclic gear group including a first gear coupled to the input shaft, a second gear coupled to the first output shaft and a third gear. The second epicyclic gear group has two degrees of freedom, with the second epicyclic gear group including a first gear coupled to the input shaft, a second gear coupled to the second output shaft and a third gear. The motor/generator is operatively coupled to the third gears of the first and second epicyclic gear groups so that mutually different drive forces are transmitted from the motor/generator to the first and second epicyclic gear groups.

11 Claims, 8 Drawing Sheets

DRIVE FORCE DISTRIBUTION APPARATUS

CROSS-REFERENCE TO RELATED APPLICATIONS

This application claims priority to Japanese Patent Application No. 2006-066008, filed on Mar. 10, 2006, Japanese Patent Application No. 2006-071249, filed on Mar. 15, 2006 and Japanese Patent Application No. 2007-027057, filed on Feb. 6, 2007. The entire disclosures of Japanese Patent Application Nos. 2006-066008, 2006-071249 and 2007-027057 are hereby incorporated herein by reference

BACKGROUND OF THE INVENTION

1. Field of the Invention

The present invention generally relates to a drive force distribution apparatus for controlling a distribution ratio of a drive force in a vehicle that is distributed between at least one first wheel and at least one second wheel.

2. Background Information

Drive force distribution apparatus have been proposed in the past for distributing the drive force generated in a vehicle by an engine or the like between a pair of front wheels of the vehicle and a pair of rear wheels of the vehicle. One example of such a drive force distribution apparatus is disclosed in Japanese Translation of PCT International Application No. 2004-505216. This drive force distribution apparatus utilizes a single input shaft and two output shafts that can rotate at different speeds. The output shafts are coupled respectively with the front drive shaft and the rear drive shaft and are also coupled with an epicyclic gear apparatus. The epicyclic gear apparatus is configured with three epicyclic gear groups, two independently controllable clutches, and a power source for operating the clutches.

According to this drive force distribution apparatus, torque is made to move from the rear output shaft to the front output shaft by the operation of one clutch, and torque is made to move from the front output shaft to the rear output shaft by the operation of the other clutch, allowing the distribution of drive force between the front and rear wheels to be controlled.

In view of the above conventional technology, it will be apparent to those skilled in the art from this disclosure that there exists a need for an improved drive force distribution apparatus. This invention addresses this need in the art as well as other needs, which will become apparent to those skilled in the art from this disclosure.

SUMMARY OF THE INVENTION

In the conventional drive force distribution apparatus, as mentioned above, three epicyclic gears, two clutches, and a power source for operating the two clutches are necessary to carry out the distribution of drive force between the front and rear wheels. This results in the size of the drive force distribution apparatus being rather large.

One object of the present invention is to provide a drive force distribution apparatus that can control the distribution ratio of a drive force without being large.

According to one aspect of the present invention, a drive force distribution apparatus is provided that basically comprises an input shaft, first and second output shafts, a first epicyclic gear group, a second epicyclic gear group and a motor/generator. The first epicyclic gear group has two degrees of freedom, with the first epicyclic gear group including a first gear coupled to the input shaft, a second gear coupled to the first output shaft and a third gear. The second epicyclic gear group has two degrees of freedom, with the second epicyclic gear group including a first gear coupled to the input shaft, a second gear coupled to the second output shaft and a third gear. The motor/generator is operatively coupled to the third gears of the first and second epicyclic gear groups so that mutually different drive forces are transmitted from the motor/generator to the first and second epicyclic gear groups.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
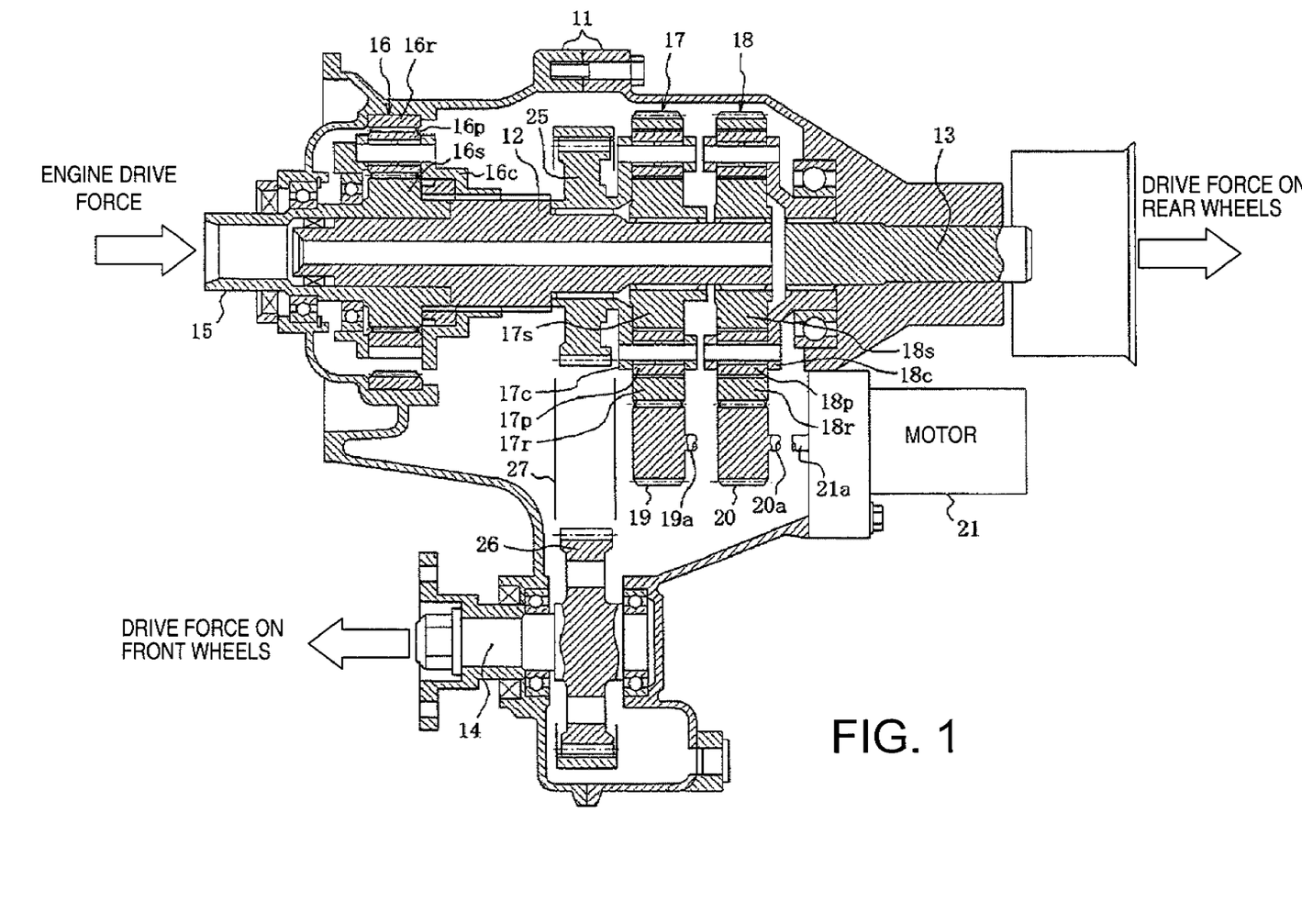
FIG. 1 is a longitudinal side cross-sectional view of a drive force distribution apparatus that is configured as a center differential gear apparatus for driving the wheels of a four-wheel-drive vehicle in accordance with a first embodiment of the present invention.

Referring initially to FIG. 1, a drive force distribution apparatus is illustrated in accordance with a first embodiment of the present invention. FIG. 1 is a longitudinal side cross-sectional view of the drive force distribution apparatus that is configured as a center differential gear apparatus for driving the wheels of a four-wheel-drive vehicle.

As seen in FIG. 1, the drive force distribution apparatus includes a housing 11, an input shaft 12, a rear-wheel output shaft 13 and a front-wheel output shaft 14. The input shaft 12 and the rear-wheel output shaft 13 are coaxially arranged and rotatably supported within the housing 11. The front-wheel output shaft 14 is arranged parallel to the input shaft 12 and the rear-wheel output shaft 13, but is radially offset therefrom and rotatably supported within the housing 11.

The drive force distribution apparatus further includes a drive shaft 15 is rotatably coupled to the end of the input shaft 12 farthest from the rear-wheel output shaft 13. The drive shaft 15 is rotatably supported within the housing 11 and protrudes out of the housing 11. The crankshaft of an engine (not shown) acts as the common source of motive power for the drive force distribution apparatus. The crankshaft of an engine (not shown) is fixedly coupled with the end of the drive shaft 15 that protrudes from the housing 11 for inputting the drive force of the engine.

The drive force distribution apparatus further includes an epicyclic gear group 16, an epicyclic gear group 17 and an epicyclic gear group 18. The epicyclic gear group 16 is mounted on the end of the drive shaft 15 within the housing 11, while the epicyclic gear groups 17 and 18 are mounted on the end of the input shaft 12 closest to the rear-wheel output shaft 13 and have identical specifications and gear ratios. The epicyclic gear group 16 is configured and arranged for deceleration of the vehicle. The epicyclic gear groups 17 and 18 act as two differential units that have three main elements and two degrees of freedom.

The deceleration epicyclic gear group 16 is a simple epicyclic gear group that includes a sun gear 16s, a ring gear 16r, a plurality of pinions (planet gears) 16p and a carrier 16c. The sun gear 16s is integrally formed with the drive shaft 15. The ring gear 16r encircles the sun gear 16s. The pinions (planet gears) 16p engage the sun gear 16s and the ring gear 16r. The carrier 16c rotatably supports the pinions 16p. The ring gear 16r is fixed to the housing 11, and the carrier 16c is coupled with the input shaft 12.

The drive force of the engine is transmitted from the drive shaft 15 to the sun gear 16s which causes the pinions 16p to roll (to revolve about the sun gear 16s) between the sun gear 16s and the ring gear 16r at a reduced speed in the same direction as the rotation of the engine. The fixed ring gear 16r is used as a reaction-force element. Thus, this drive force or torque is transmitted to the input shaft 12 via the carrier 16c. The epicyclic gear group 16 is therefore devised in order to decelerate the drive force of the engine on the drive shaft 15 and to transmit the drive force to the input shaft 12 without changing the direction of rotation.

The epicyclic gear group 17 is a simple epicyclic gear group that includes a central sun gear 17s, a ring gear 17r, a plurality of pinions (planet gears) 17p and a carrier 17c. The central sun gear 17s is non-rotatably supported on the input shaft 12. The ring gear 17r encircles the sun gear 17s. The pinions (planet gears) 17p engage the sun gear 17s and the ring gear 17r. The carrier 17c rotatably supports the pinions 17p. The epicyclic gear group 18 is a simple epicyclic gear group that includes a central sun gear 18s, a ring gear 18r, a plurality of pinions (planet gears) 18p and a carrier 18c. The central sun gear 18s is non-rotatably supported on the input shaft 12. The ring gear 18r encircles the sun gear 18s. The pinions (planet gears) 18p engage the sun gear 18s and the ring gear 18r. The carrier 18c rotatably supports the pinions 18p.

The sun gears 17s and 18s act as first elements that are identical in the epicyclic gear groups 17 and 18. The sun gears 17s and 18s are fixedly coupled to the input shaft 12 so as to rotate together therewith. Thus, the engine drive force is transmitted from the drive shaft 15 to the input shaft 12 by way of the epicyclic gear group 16 and then transmitted to the sun gears 17s and 18s.

The ring gears 17r and 18r have gear teeth of identical specifications formed on the outer circumference of the ring gears 17r and 18r. The ring gears 17r and 18r act as the second elements that are identical in the epicyclic gear groups 17 and 18. The outer circumference (gear teeth) of the ring gears 17r and 18r are engaged with a pair of control pinions 19 and 20, respectively. The control pinions 19 and 20 both have identical specifications, and are rotatably supported within the housing 11 in order to control the distribution of the drive force (torque) to the front and rear wheels. The control pinion 19 is fixed to a pinion shaft 19a, while the control pinion 20 is fixed to a pinion shaft 20a.

Figure 2:
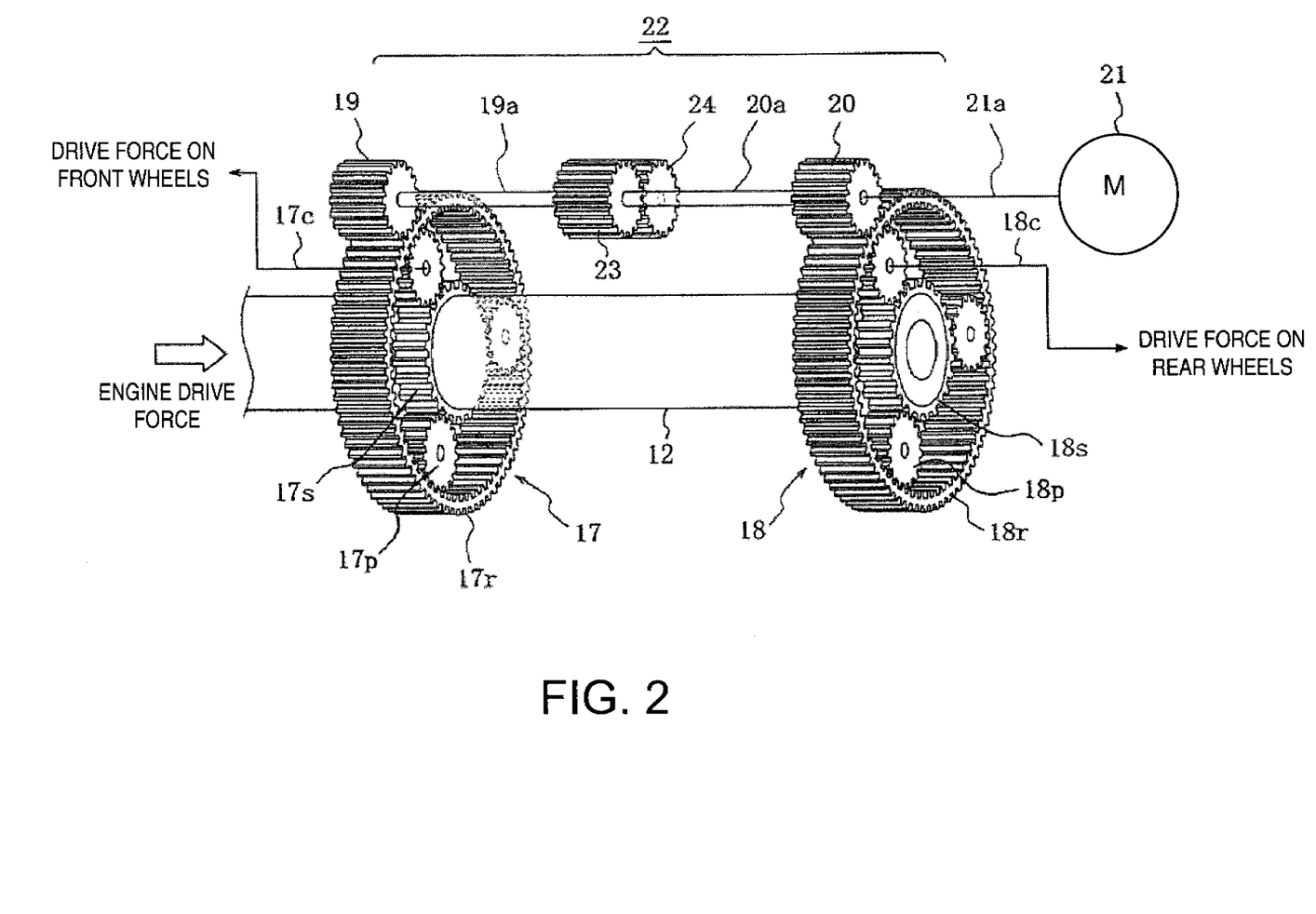
FIG. 2 is a simplified perspective view of the drive force distribution apparatus showing a motor-output transmission system of a motor/generator for controlling the distribution of drive force in the drive force distribution apparatus in accordance with the first embodiment of the present invention.

The drive force distribution apparatus further includes a motor/generator 21 that transmits torque to the control pinions 19 and 20. The motor/generator 21 is fixed to the housing 11. The motor/generator 21 is a power source that controls the distribution of drive force to the front and rear wheels. The motor/generator 21 has a motor-output shaft 21a. Thus, the motor-output shaft 21a rotates together with the control pinion 19 and the control pinion 20. The motor-output transmission system 22 includes the control pinions 19 and 20, the pinion shafts 19a and 20a and a pair of middle pinions 23 and 24 as shown in FIG. 2.

The motor-output shaft 21a and the control-pinion shaft 20a are directly coupled so as to rotate as an integrated unit. The motor-output shaft 21a and the control-pinion shaft 20a can also be formed integrally. The adjacent ends of the control-pinion shafts 19a and 20a are coupled together by the middle pinions 23 and 24. Specifically, the middle pinion 23 is fixedly coupled to the end of the control-pinion shaft 20a so that they rotate as an integrated unit. Likewise, the middle pinion 24 is fixedly coupled to the end of the control-pinion shaft 19a so that they rotate as an integrated unit therewith. The middle pinion 24 is engaged with the middle pinion 23 so that they rotate together as an integrated unit. The specification for the number of teeth of the middle pinions 23 and 24 is arbitrary, but the specified numbers should preferably be the same when taking into account the control over the distribution of drive force to the front and rear wheels.

As shown in FIG. 1, the drive force distribution apparatus further includes a sprocket 25, a sprocket 26 and a chain 27. The sprocket 25 is rotatably provided to the input shaft 12 between the epicyclic gear groups 16 and 17. The carrier 17c of the epicyclic gear group 17 is integrally coupled with the sprocket 25. The sprocket 26 is positioned in the same axially perpendicular plane as the sprocket 25, and is formed integrally with the front-wheel output shaft 14 or is coupled with the front-wheel output shaft 14 in a drive-transmitting arrangement. The chain 27 extends between the sprockets 25 and 26 for transmitting the drive force (torque) from the input shaft 12 to the front-wheel output shaft 14. The front end (the end closest to the engine) of the front-wheel output shaft 14 protrudes from the housing 11 and can connect to the front-wheel drive system.

The carrier 18c of the epicyclic gear group 18 is fixedly coupled with the end of the rear-wheel output shaft 13 closest to the input shaft 12. The end of the rear-wheel output shaft 13 farthest from the input shaft 12 protrudes from the housing 11 and is connect to the rear-wheel drive system.

The drive force distribution apparatus further includes a braking arrangement controlled by the motor/generator 21 for securing in place and thereby immobilizing the motor-output transmission system 22, shown in FIG. 2. The braking arrangement can be provided separately, but connected to the system 22 at a desired location, or can be provided within the motor/generator 21. When the motor-output transmission system 22 accommodates a worn-gear type irreversible gear group, this gear group will itself act as braking arrangement and will obviate the use of a specialized braking arrangement.

Figure 3:
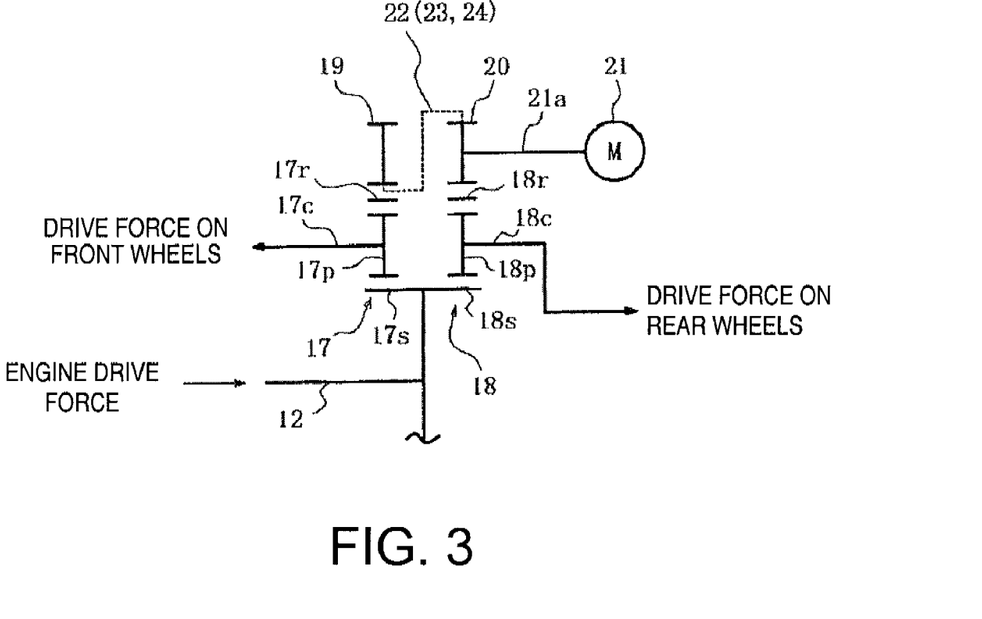
FIG. 3 is a simplified schematic view (skeleton diagram) of the drive force distribution apparatus of the first embodiment of the present invention.
Figure 4:
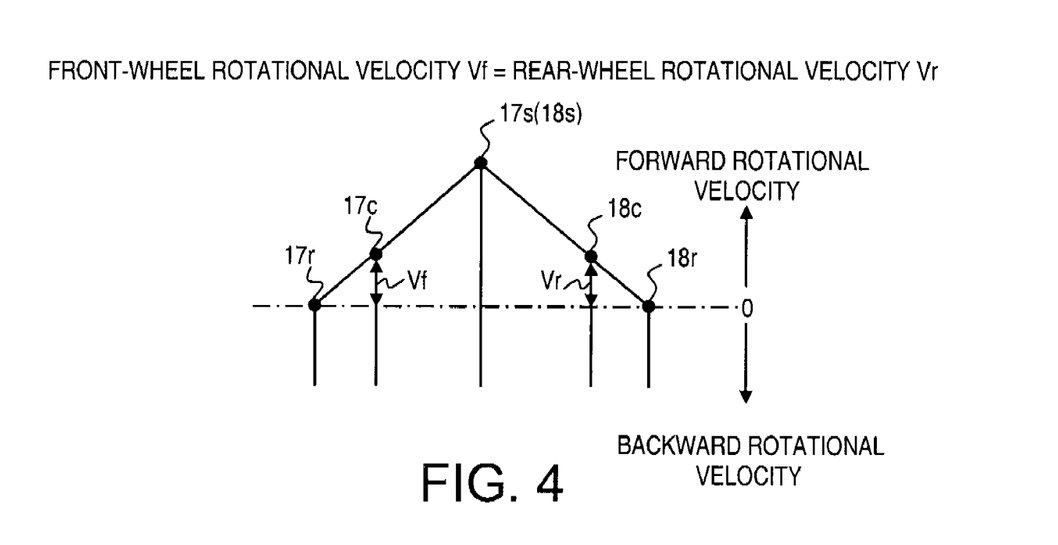
FIG. 4 is a collinear graph of the drive force distribution apparatus in accordance with the first embodiment of the present invention.
Figure 5:
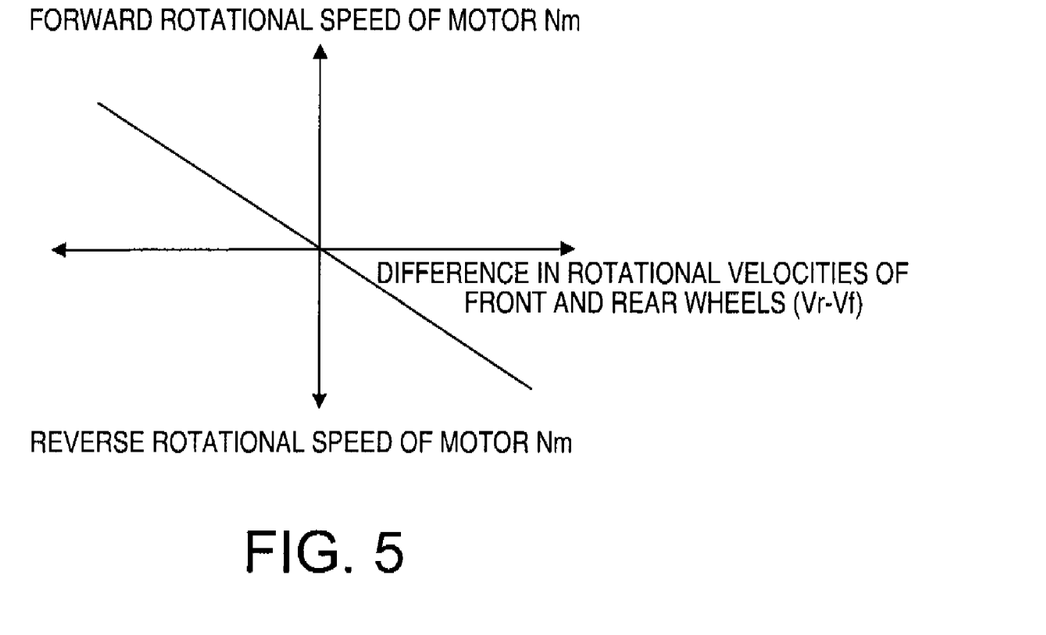
FIG. 5 is a graph of the operation characteristics of the drive force distribution apparatus in accordance with the first embodiment of the present invention.
Figure 6:
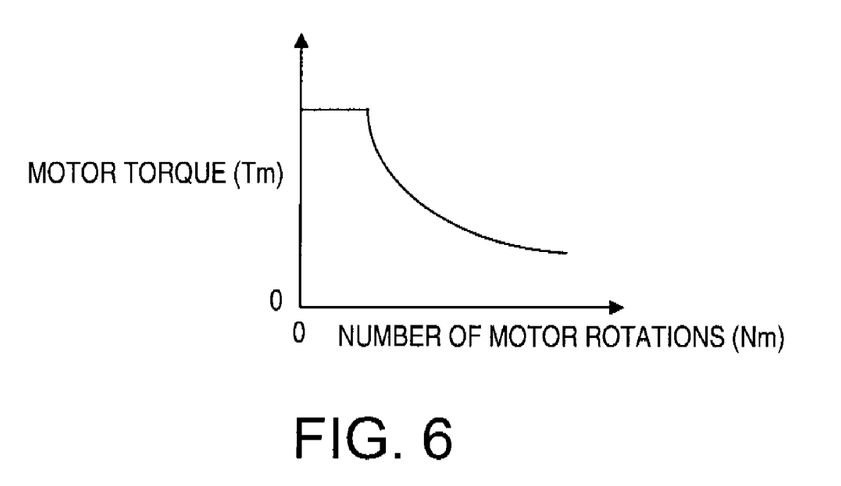
FIG. 6 is a performance line graph that illustrates the general correlation between the number of motor rotations and the motor torque of a motor/generator.

As shown in FIG. 4, a collinear graph is shown for the drive force distribution apparatus of the first embodiment of FIGS. 1 to 3.

The operation of the drive force distribution apparatus of the first embodiment shown in FIGS. 1 to 3 will be described below with reference to these drawings.

When the brake arrangement is operated and the output transmission system 22 (see FIG. 2) of the motor/generator 21 is immobilized, the control pinions 19 and 20 are also immobilized. As a result, the ring gears 17r and 18r of the epicyclic gear groups 17 and 18 are kept from rotating (i.e., they have a rotation rate of zero).

Since the rotation rate of the ring gears 17r and 18r is zero, in such instances, the collinear graph of the drive force distribution apparatus is as shown in FIG. 4.

The engine drive force input via the input shaft 12 is input to both of the sun gears 17s and 18s of the epicyclic gear groups 17 and 18. The drive force input to the sun gear 17s is output by the carrier 17c, where the ring gear 17r is used as a reaction-force element. The drive force then passes successively through the sprocket 25, the chain 27, the sprocket 26, and the front-wheel output shaft 14 on the way to the front wheels. The drive force is also inputted to the sun gear 18s which outputs the drive force by the carrier 18c, where the ring gear 18r is used as an anchor or reaction force element. The drive force then passes through rear-wheel output shaft 13 on the way to the rear wheels.

In other words, the engine drive force from the input shaft 12 is distributed and outputted to the front and rear wheels by the epicyclic gear groups 17 and 18. Since the ring gears 17r and 18r of the epicyclic gear groups 17 and 18 are both fixed in the same manner at this point, the front-wheel rotational velocity Vf and the rear-wheel rotational velocity Vr are the same, as shown in FIG. 4. Also the drive force on the front wheels and the drive force on the rear wheels are equal.

In forward travel, when reaction forces with respect to the road surface for the front and rear wheels (drive forces generated by the front and rear wheels) are the same, the front-wheel rotational velocity Vf and the rear-wheel rotational velocity Vr are the same. Since the ring gears 17r and 18r (acting as reaction-force elements) are coupled together so as to rotate in mutually opposite directions via the motor-output transmission system 22, there is no rotation at such times. Even if the rotation of the motor-output transmission system 22 is not stopped by operation of the braking control of the motor/generator 21, the collinear graph of the drive force distribution apparatus in such instances will be as shown in FIG. 4, the front-wheel rotational velocity Vf and the rear-wheel rotational velocity Vr will be the same, and the drive force on the front wheels and the drive force on the rear wheels will be equal.

In a state when the distribution of drive force to the front and rear wheels is 50:50, as described above, the braking control is released and the motor/generator 21 is driven so that a torque is output in the same direction as the rotation of the engine. The control pinion 20 therefore receives the torque and rotates in the same direction as the rotation of the engine via the motor-output shaft 21a. The ring gear 18r thereby receives a torque that causes rotation in the direction opposite to the rotation of the engine.

Meanwhile, the motor-output shaft 21a, which is driven in the same direction as the rotation of the engine, transmits a torque that causes the control pinion 19 to rotate in the direction opposite to the rotation of the engine via the control-pinion shaft 20a, the middle pinions 23 and 24, and the control pinion shaft 19a. The control pinion 19 then transmits such torque to the ring gear 17r, causing rotation in the same direction as the rotation of the engine.

Thus, a torque that causes rotation in the same direction as the rotation of the engine is provided to the ring gear 17r in such instances. This torque is transmitted to the carrier 17c and acts to cause the front wheels to move forward. The drive force on the front wheels is thereby increased. A torque that causes rotation in the direction opposite to the rotation of the engine is provided to the ring gear 18r. This torque is transmitted to the carrier 18c and acts to cause the rear wheels to move backwards. The torque that causes the rear wheels to move forward is thereby reduced. Thus, according to the drive force distribution apparatus of the present embodiment, four-wheel driving is possible in a state wherein the drive force on the front wheels is larger than the drive force on the rear wheels.

The difference in the drive forces on the front and rear wheels can be continuously increased in proportion to the magnitude of the torque of the motor/generator 21 in the same direction as the rotation of the engine. In other words, the distribution of drive force to the front and rear wheels is not related to the rotational velocity output to the front and rear wheels (the vehicle speed) or to the relative magnitudes of the rotational velocities of the front and rear wheels, and can be freely controlled by the torque output from the motor/generator 21.

In a state when the distribution of drive force to the front and rear wheels is 50:50, the braking control is released and the motor/generator 21 is driven so that a torque is output in the direction opposite to the rotation of the engine. The control pinion 20 therefore receives the torque and rotates in the direction opposite to the rotation of the engine via the motor-output shaft 21a. The ring gear 18r thereby receives a torque that causes rotation in the same direction as the rotation of the engine.

Meanwhile, the motor-output shaft 21a is driven in the direction opposite to the rotation of the engine, and transmits a torque that causes the control pinion 19 to rotate in the same direction as the rotation of the engine via the control-pinion shaft 20a, the middle pinions 23 and 24, and the control pinion shaft 19a. The control pinion 19 then transmits such torque to the ring gear 17r, causing the ring gear 17r to rotate in the direction opposite to the rotation of the engine.

Thus, a torque that causes rotation in the direction opposite to the rotation of the engine is provided to the ring gear 17r in such instances. This torque is transmitted to the carrier 17c and acts to cause the front wheels to move backward. The drive force on the front wheels is thereby reduced. A torque that causes rotation in the same direction as the rotation of the engine is provided to the ring gear 18r. This torque is transmitted to the carrier 18c and acts to cause the rear wheels to move forward. The drive force on the rear wheels is thereby increased. Thus, four-wheel driving is possible in a state wherein the drive force on the front wheels is smaller than the drive force on the rear wheels.

The difference in the drive forces on the front and rear wheels can be continuously increased in proportion to the magnitude of the torque of the motor/generator 21 in the direction opposite the rotation of the motor.

The distribution ratio of the drive force to the front and rear wheels will now be described. When the term Tc is the torque of the carrier, the term Tr is the torque of the ring gear, and the term Ts is the torque of the sun-gear, $$Tc = Tr + Ts \tag{1}$$

When the term Zr is the number of teeth of the ring gear, the term Zs is the number of teeth of the sun gear, and the term Zp is the number of teeth of the pinion, the torque Tr of the ring gear and the torque Ts of the sun gear in the equation above can be obtained by the following equations:

$$Tr = Tc \times \{Zr/(Zr+Zs)\} \tag{2}$$

$$Ts = Tc \times \{Zs/(Zr+Zs)\} \tag{3}$$

When the motor torque of the motor/generator 21 is Tm and the number of teeth of the control pinions 19 and 20 is Zpo, the torque α on the ring gear from the motor/generator 21 is given by:

$$\alpha = Tm(Zr/Zpo) \tag{4}$$

One half (½ α) of the torque α is transmitted to the front wheels, and the other half (½ α) is transmitted to the rear wheels (the directions for the front and rear wheels are opposite).

From equation (2), the difference in torque Tr' between the ring gears 17r and 18r can be obtained as followed:

$$Tr' \times \{(Zr+Zs)/Zr\} = \{Tm(Zr/Zpo)\} \times \{(Zr+Zs)/Zr\} \tag{5}$$

$$= Tm \times \{(Zr+Zs)/Zpo\}$$

The difference in torque between the ring gears 17r and 18r in the equation shown above is the difference in the drive force between the front and rear wheels and determines the distribution ratio of the drive force to the front and rear wheels.

According to the present embodiment, the distribution ratio of the drive force can be controlled by controlling the torque of the motor/generator 21 using a small configuration of two epicyclic gear groups, the motor/generator 21, and the motor-output transmission system 22 wherein the torque from the motor/generator 21 is transmitted in opposite directions to the ring gear 17r and the ring gear 18r. The size of the drive force distribution apparatus can thereby be restricted. The motor/generator 21 has no relation to the rotational velocity output to the front and rear wheels (the vehicle speed), and control of the distribution of drive force to the front and rear wheels as described above can be accomplished according to the magnitude of the torque. Therefore, the various operational effects can be achieved as mentioned below.

In other words, the motor/generator 21 need not rotate at high speeds when the rotational velocity output to the front and rear wheels (the vehicle speed) is high, and problems wherein the durability of the motor/generator 21 is reduced do not occur.

If the motor/generator 21 is configured to rotate at a high speed when the rotational velocity output to the front and rear wheels (the vehicle speed) is high, the motor/generator 21 will be unable to execute the expected distribution of drive force to the front and rear wheels due to a lack of torque caused by the high rotational velocity when the vehicle speed and the rotational velocity output to the front and rear wheels are high. Avoiding this problem requires the use of a high-speed, high-output motor/generator, which entails problems in being expensive and difficult to install.

In comparison, the motor/generator 21 according to the present embodiment has no relation to the rotational velocity output to the front and rear wheels (the vehicle speed) and can determine the distribution of torque. Therefore, high speed and high output are not necessary for the motor/generator 21, which can be low speed and low output, removing drawbacks as regards space and cost considerations.

If the number of rotations Nm of the motor/generator 21 is dependent on the rotational velocity output to the front and rear wheels (the vehicle speed), then feedback torque control should be carried out by the motor/generator 21 when controlling the distribution of drive force to front and rear wheels, resulting in reduced control. However, when the torque of the motor/generator 21 can be determined independently from the rotational velocity output to the front and rear wheels (the vehicle speed), as in the present embodiment, the torque control that should be carried out by the motor/generator 21 when controlling the distribution of drive force to front and rear wheels is not of a feedback type corresponding to the number of rotations, resulting in improved control.

In order to enable control over the distribution of the drive force to the front and rear wheels in the present embodiment, the motor-output transmission system 22 (see FIG. 2) is configured so that the ring gears 17r and 18r rotate in mutually opposite directions when different torques are transmitted from the motor/generator 21 to the ring gears 17r and 18r of the epicyclic gear groups 17 and 18. However, the motor-output transmission system 22 can instead be configured so that the ring gears 17r and 18r are driven in the same direction and different torques are transmitted to the ring gears 17r and 18r from the motor/generator 21.

The gear ratios between the constituting elements of the epicyclic gear groups 17 and 18 in the present embodiment were described as being the same between the epicyclic gear groups 17 and 18, but the gear ratios between the constituting elements of the epicyclic gear groups 17 and 18 can also be made to differ between the epicyclic gear groups 17 and 18.

A second embodiment of the present invention will be described with reference to FIGS. 7 to 11.

Figure 7:
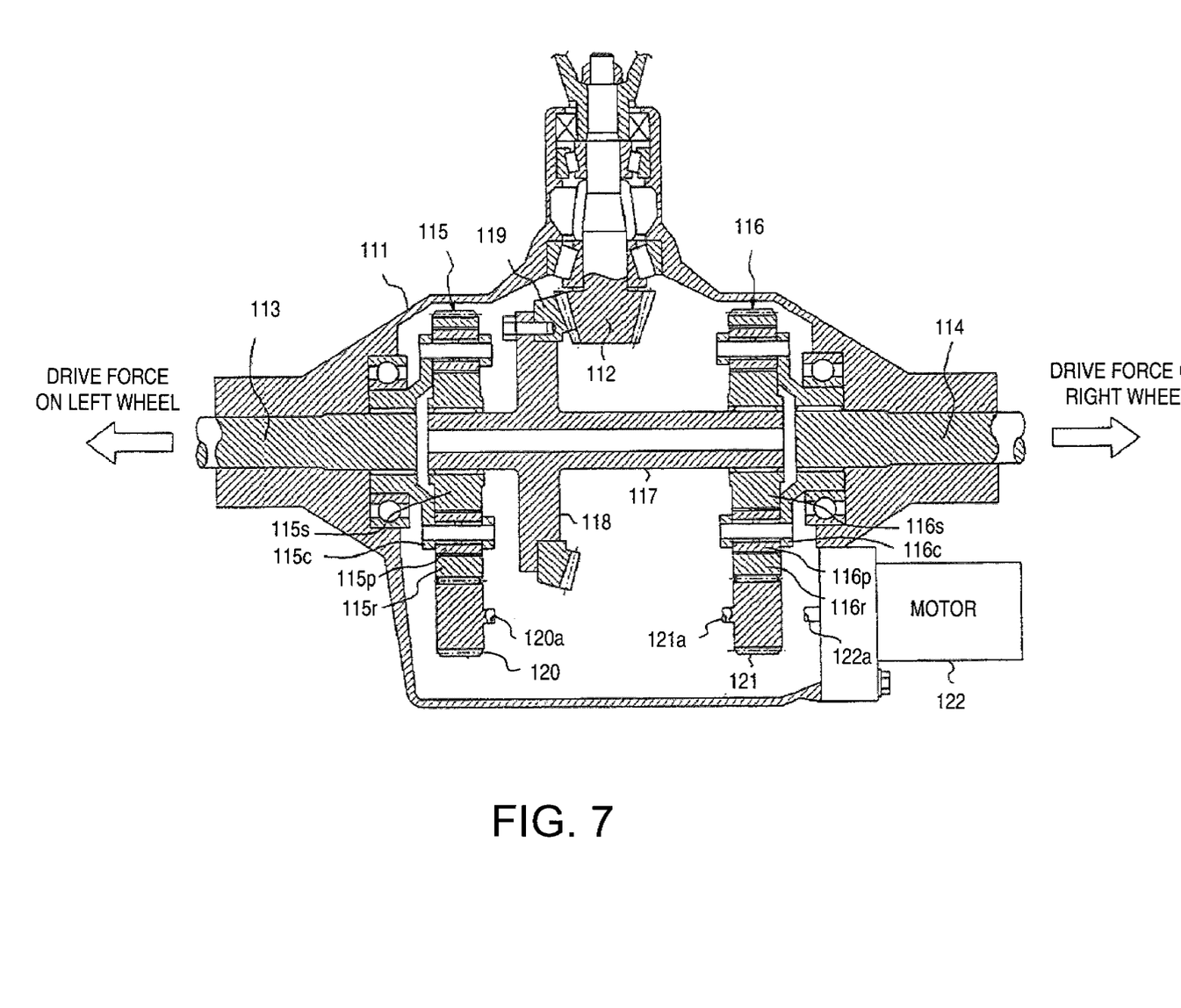
FIG. 7 is a transverse cross sectional view of a differential-limiting drive force distribution apparatus configured as a differential gear apparatus provided between the left and right driven wheels of a vehicle in accordance with a second embodiment of the present invention.

FIG. 7 is a transverse cross sectional view that shows a differential-limiting drive force distribution apparatus configured as a differential gear apparatus provided between the left and right driven wheels of a vehicle in accordance with a second embodiment of the present invention In FIG. 7, the drive force distribution apparatus of the second embodiment includes a housing 111, a final drive pinion 112, a left driven wheel output shaft 113 and a right driven wheel output shaft 114. The left and right driven wheel output shafts 112 and 113 are coaxially arranged and rotatably supported within the housing 111. The final drive pinion 112 acts as an input shaft. The final drive pinion 112 is also rotatably supported within the housing 111 but is positioned perpendicularly with respect to the axes of the left driven wheel output shaft 113 and the right driven wheel output shaft 114. The final drive pinion 112 is positioned between the left driven wheel output shaft 113 and the right driven wheel output shaft 114.

The end of the final drive pinion 112 farthest from the left driven wheel output shaft 113 and the right driven wheel output shaft 114 protrudes from the housing 111. The drive force of the engine is input to this end via a propeller shaft (not shown).

The ends of the left driven wheel output shaft 113 and the right driven wheel output shaft 114 that are farthest from the ends of the shafts that face each other protrude from the housing 111. A left driven wheel (not shown) and a right driven wheel (not shown) are coupled with these protruding ends via respective drive shafts (not shown).

The drive force distribution apparatus further includes epicyclic gear groups 115 and 116 that act as differential units having three elements and two degrees of freedom are provided between the mutually facing ends of the left driven wheel output shaft 113 and the right driven wheel output shaft 114. In the specification of the epicyclic gear groups 115 and 116, the gear ratios are the same.

The epicyclic gear groups 115 and 116 are positioned coaxially with the left driven wheel output shaft 113 and the right driven wheel output shaft 114. The epicyclic gear group 115 is positioned closer to the left driven wheel output shaft 113, while the epicyclic gear group 116 is positioned closer to the right driven wheel output shaft 114.

The epicyclic gear group 115 is a simple epicyclic gear group that includes a central sun gear 115s, a ring gear 115r, a plurality of pinions (planet gears) 115p and a carrier 115c. The ring gear 115r encircles the sun gear 15s. The pinions (planet gears) 115p engage the sun gear 115s and the ring gear 115r. The carrier 115c rotatably supports the pinions 115p. The epicyclic gear group 116 is a simple epicyclic gear group that includes a central sun gear 116s, a ring gear 116r, a plurality of pinions (planet gears) 116p, and a carrier 1116c. The ring gear 116r encircles the sun gear 116s. The pinions (planet gears) 116p engage the sun gear 116s and the ring gear 1116r. The carrier 116c rotatably supports the pinions 116p.

The sun gears 115s and 116s act as first elements that are identical in the epicyclic gear groups 115 and 116. The sun gears 115s and 116s are coupled together by a connecting shaft 117 so as to rotate together as an integrated unit. A final-drive ring gear 119 is attached to the outer circumference of a flange 118 that is integrally formed with the connecting shaft 117. The final-drive ring gear 119 is engaged with the final drive pinion 112, both of which constitute the final drive.

Engine drive force that is input to the final drive pinion 112 therefore passes through the final-drive ring gear 119, the flange 118, and the connecting shaft 117. The engine drive force is input to the sun gears 115s and 116s of the epicyclic gear groups 115 and 116. The sun gears 115s and 116s function as input elements.

The carriers 115c and 116c rotatably support the pinions 115p and 116p, which act as second elements that are identical in the epicyclic gear groups 115 and 116. The carriers 115c and 1116c are both rotationally coupled with the mutually opposed ends of the left driven wheel output shaft 113 and the right driven wheel output shaft 114. The carriers 115c and 116c both constitute output elements.

The ring gears 115r and 116r have gear teeth with identical specifications formed on their outer circumferences. The ring gears 115r and 116r act as remaining elements that are identical in the epicyclic gear groups 115 and 116. The outer circumferences of the ring gears 115r and 116r are engaged with a pair of control pinions 120 and 121. The control pinions 120 and 121 both have identical specifications and are rotatably supported within the housing 111. The control pinions 120 and 121 are engaged with the outer circumferences of the ring gears 115r and 116r for providing differential limitation. The control pinion 120 is fixed to a control-pinion shaft 120a, while the control pinion 121 is fixed to a control-pinion shaft 121a.

The drive force distribution apparatus further includes an electromotive motor/generator 122 that acts as a power source. The electromotive motor/generator 122 is fixed to the housing 111 in order to limit rotation of the control pinions 120 and 121 and to limit differences in rotation between the left and right wheels (i.e., to carry out differential limitation).

Figure 8:
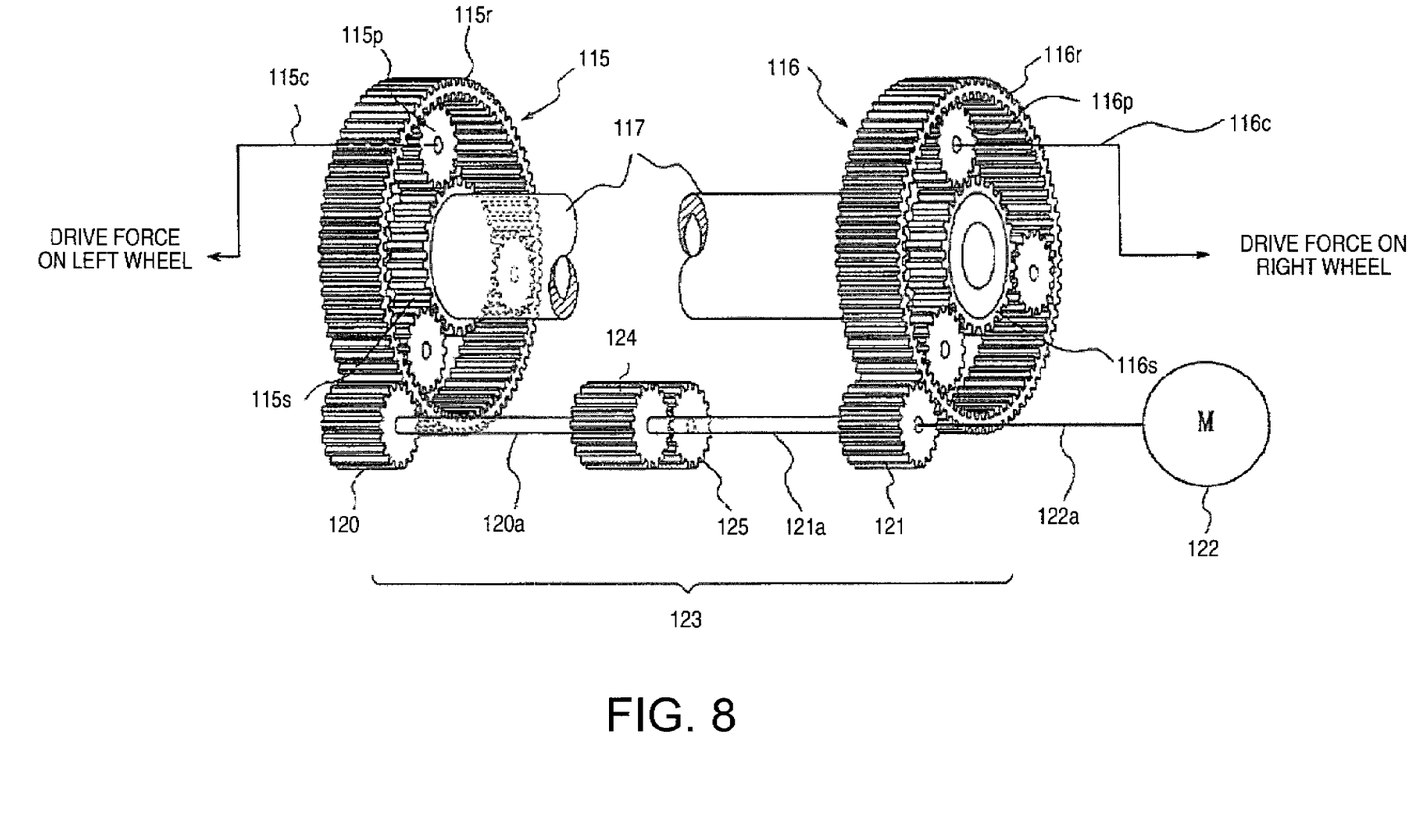
FIG. 8 is a simplified perspective view of the differential-limiting drive force distribution apparatus showing the output transmission system of a (differential-limiting) motor/generator for controlling differences in output rotation in the differential-limiting drive force distribution apparatus in accordance with the second embodiment of the present invention.

The motor/generator 122 has an output shaft 122a. Thus, the output shaft 122a rotates together with the control pinion 120 and the control pinion 121. The reverse-direction transmission system 123 includes the control pinions 120 and 121, the control-pinion shafts 120a and 121a and a pair of middle pinions 124 and 125 as shown in FIG. 8. The control pinions 120 and 121 (and therefore the ring gears 115r and 116r) are coupled together by the reverse-direction transmission system 123 so as to rotate in mutually opposite directions. An output shaft 122a of the motor/generator 122 is interconnected with the reverse-direction system 123 as described below.

In other words, the output shaft 122a of the motor/generator 122 and the control pinion 121 are directly connected together so as to rotate as an integrated unit, or are integrally coupled together. The adjacent ends of the control-pinion shafts 120a and 121a are coupled together by the middle pinions 124 and 125. Specifically, the middle pinion 124 is fixedly coupled to the end of the control-pinion shaft 120a so that they rotate as an integrated unit. Likewise, the middle pinion 125 is fixedly coupled to the end of the control-pinion shaft 121a so that they rotate as an integrated unit therewith. The middle pinions 124 and 125 are engaged with one another, The specifications for the number of teeth of the middle pinions 124 and 125 should preferably be the same in order to simplify control of differential limitation.

Figure 9:
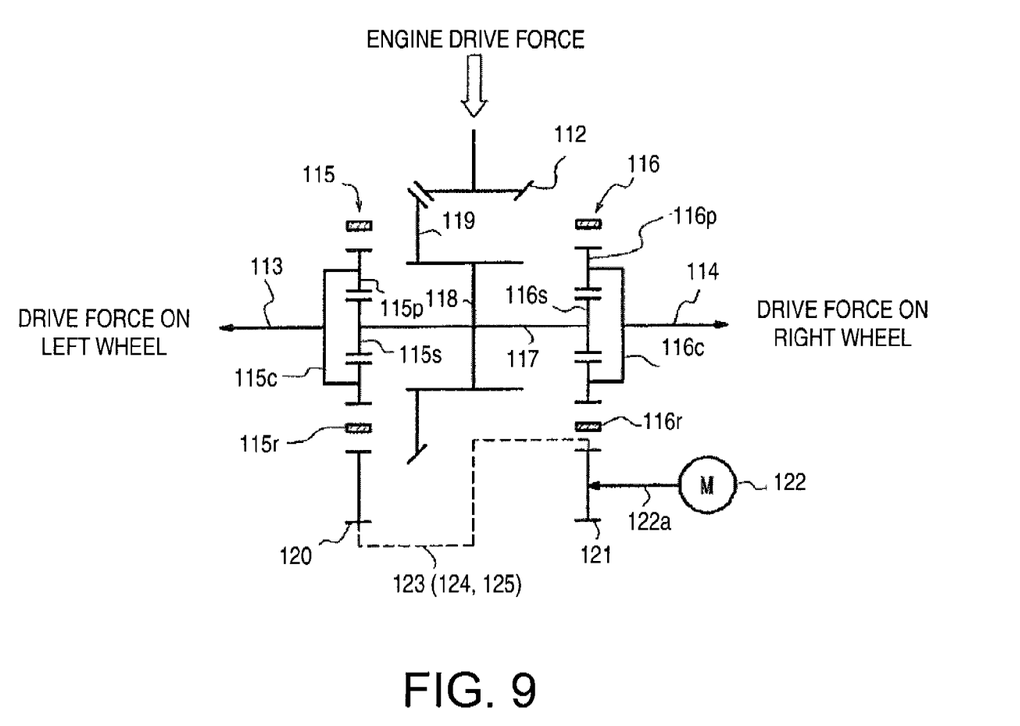
FIG. 9 is a simplified schematic view (skeleton diagram) of the differential-limiting drive force distribution apparatus in accordance with the second embodiment of the present invention.

The differential-limiting drive force distribution apparatus of the present embodiment, as shown in FIGS. 7 and 8, is schematically shown in FIG. 9.

The operation of the differential-limiting drive force distribution apparatus of the present embodiment will be described below using these drawings.

The drive force of the engine passes from the final drive pinion 112 through the final-drive ring gear 119, the flange 118, and the connecting shaft 117 and is transmitted to the sun gears 115s and 116s of the epicyclic gear groups 115 and 116. Since the ring gears 115r and 116r are coupled together by the reverse-direction transmission system 123, the ring gears 115r and 116r are used as reaction-force elements. Thus, the engine drive force transmitted to the sun gears 115s and 116s passes from the sun gears 115s and 116s to the carriers 115c and 116c and is then distributed and outputted to the output shafts 113 and 114 to the left and right driven wheels.

If there are no differences in rotation produced between the left and right wheels when traveling forward, when reaction forces with respect to the road surface for the left and right wheels (drive forces generated by the left and right wheels) are the same, the ring gears 115r and 116r that act as reaction-force elements will not rotate. The rotation of the reverse-direction transmission system 123 that couples the ring gears 115r and 116r together is therefore also zero.

Figure 10:
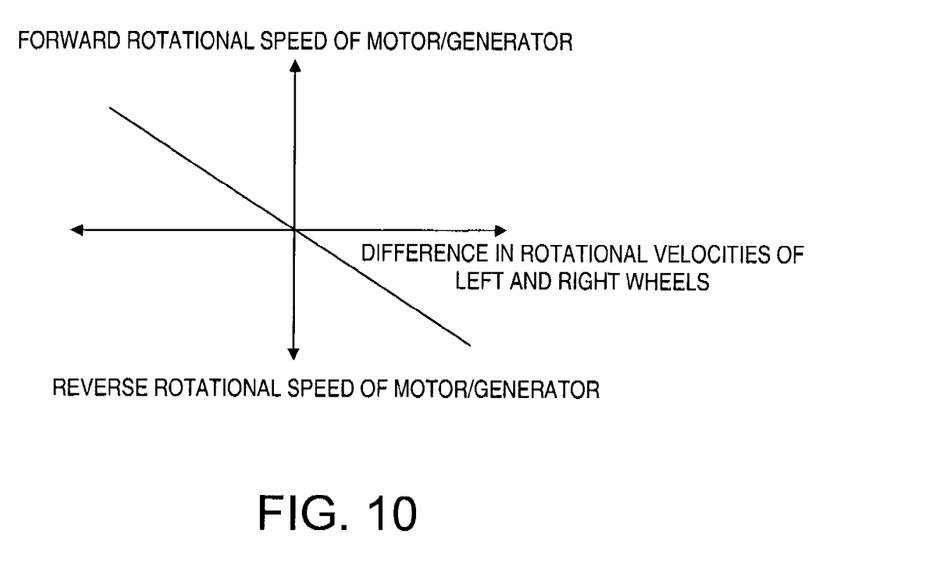
FIG. 10 is a graph of the operation characteristics of the differential-limiting drive force distribution apparatus in accordance with the second embodiment of the present invention.
Figure 11:
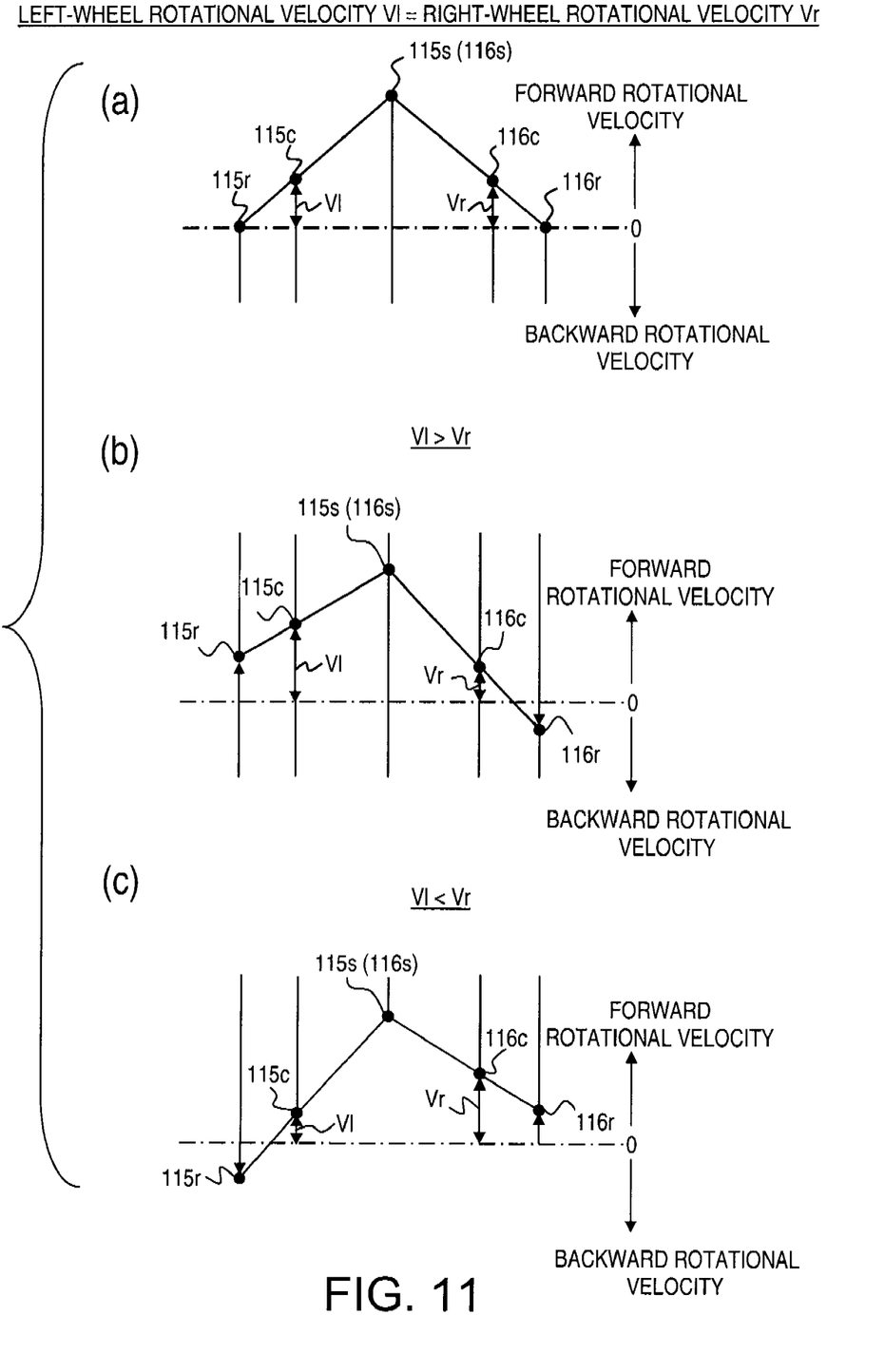
FIG. 11 is a series of collinear graphs of the drive force distribution apparatus in accordance with the second embodiment of the present invention, with graph (a) showing where the drive force to the left wheel and the drive force to the right wheel are the same and the distribution of the drive force to the left and right wheels is 50:50; graph (b) showing where the drive force to the left wheel is larger than the drive force to the right wheel when turning right; and graph (c) showing where the drive force to the left wheel is smaller than the drive force to the right wheel when turning left.

If differences in rotation are produced between the left and right wheels due to differences in the reaction forces with respect to the road surface for the left and right wheels (drive forces generated by the left and right wheels) or due to the vehicle starting to turn, the ring gears 115r and 116r will rotate correspondingly with respect to the magnitude and polarity of the difference in rotation. The reverse-direction transmission system 123 in which the ring gears 115r and 116r are coupled together will also rotate in a corresponding direction at a corresponding speed. The characteristic changes in the rotational velocity of the reverse-direction transmission system 123 (i.e., the rotational velocity of the motor/generator 122) relative to the difference in rotation between the left and right wheels are as illustrated in FIG. 10. The rotational velocity of the reverse-direction transmission system 123 (i.e., the rotational velocity of the motor/generator 122) is not related to the rotational velocity of the differential gear apparatus, and changes in a linear fashion solely according to the difference in rotation between the left and right wheels.

When differential limitation is necessary to limit the difference in rotation between the left and right wheels, an electrical load is applied to the motor/generator 122 that rotates together with the reverse-direction transmission system 123, and the rotation of the reverse-direction transmission system 123 is limited, whereby the difference in rotation between the left and right wheels can be limited.

The extent of the limitation of the difference in rotation between the left and right wheels while differential limitation is in effect is the extent of the limitation of the rotation of the reverse-direction transmission system 123. In other words, the extent of the limitation of the difference in rotation between the left and right wheels can be freely determined in accordance with the electrical load applied to the motor/generator 122.

The mechanical energy corresponding to the degree to which the rotation of the reverse-direction transmission system 123 is limited while the differential limitation is in effect is converted into electrical energy and regenerated by the electrical generation of the motor/generator 122, and thus, allowing energy efficiency to be increased. Limiting the rotation of the reverse-direction transmission system 123 does not entail heat generation, eliminating the need for heat-control countermeasures and thereby affording significant advantages.

According to the configuration of the present embodiment, differential limitation is carried out to limit differences in rotation between the left and right wheels by limiting the rotation of the reverse-direction transmission system 123, which need not rotate together with the drive force distribution apparatus. The various operational effects below can accordingly be achieved.

In other words, no association is made between the rotation of the reverse-direction transmission system 123 that acts as the differential-limiting mechanism and the motor/generator 122 that acts as the power source that limits the rotation of the reverse-direction transmission system 123. The structure for limiting the rotation of the reverse-direction transmission system 123 during differential limitation is neither complex nor expensive, and bearings for absorbing relative rotation between the reverse-direction transmission system 123 and the motor/generator 122 for limiting the rotation thereof are unnecessary, thereby affording advantages in terms of cost.

Since such bearings are unnecessary, energy is not lost due to friction, gas mileage does not decrease, heat is not generated, and other such problems do not occur.

No slip is produced in the reverse-direction transmission system 123 while the rotation of the reverse-direction transmission system 123 is limited during differential limitation. Therefore, energy is not lost due to friction within the reverse transmission itself, gas mileage does not decrease, heat is not generated, and other such problems do not occur.

The distribution ratio of the drive force to the left and right wheels will now be described. The torque of the carrier Tc is calculated using equation (1), the torque Tr of the ring gear is calculated using equation (2), and the torque Ts of the sun gear is calculated using equation (3), as discussed above. Likewise, the torque a on the ring gear from the motor/generator 21 is calculated using equation (4), as discussed above, with one half (½ α) of the torque a being transmitted to the left wheel, and the other half (½ α) being transmitted to the right wheel. Also the difference in torque Tr' between the ring gears 115r and 116r is calculated using equation (5), as discussed above.

The difference in torque Tr' between the ring gears 115r and 116r in the equation shown above is the difference in drive force between the left and right wheels and determines the distribution ratio of the drive force to the left and right wheels. In other words, if the motor torque Tm of the motor/generator 122 when the vehicle is turning is transmitted to the ring gears 115r and 116r, the distribution ratio of the drive force transmitted to the left and right wheels changes, whereby turning force can be produced.

When traveling straight ahead, for example, torque is not produced by the motor/generator 122, and the left-wheel rotational velocity Vl and the right-wheel rotational velocity Vr are the same. Since the ring gears 115r and 116r that act as reaction-force elements are coupled together by the reverse-direction transmission system 123 so as to rotate in mutually opposite directions, and since no torque is transmitted from the motor/generator 122 in such instances, the ring gears 115r and 116r do not rotate. The left-wheel rotational velocity Vl and the right-wheel rotational velocity Vr are the same in this case, and the drive force to the left wheel and the drive force to the right wheels are equal, as shown by the collinear graph (a) of the drive force distribution apparatus in FIG. 11.

In a state when the distribution of drive force to the left and right wheels is 50:50, the motor/generator 122 is driven so that a torque is output in the same direction as the rotation of the engine. The control pinion 121 therefore receives the torque and rotates in the same direction as the rotation of the engine via the motor-output shaft 122a. The ring gear 116r thereby receives a torque that causes rotation in the direction opposite to the rotation of the engine.

Meanwhile, the motor-output shaft 122a, which is driven in the same direction as the rotation of the engine, transmits a torque that causes the control pinion 120 to rotate in the direction opposite to the rotation of the engine via the control-pinion shaft 121a, the middle pinions 124 and 125, and the control pinion shaft 120a. The control pinion 120 then transmits such torque to the ring gear 115r, causing rotation in the same direction as the rotation of the engine.

Thus, a torque that causes rotation in the same direction as the rotation of the engine is provided to the ring gear 115r in such instances. This torque is transmitted to the carrier 115c and acts to cause the left wheel to move forward. The drive force on the left wheel is thereby increased. A torque that causes rotation in the direction opposite to the rotation of the engine is provided to the ring gear 116r. This torque is transmitted to the carrier 116c and acts to cause the right wheel to move backwards. The torque that causes the right wheel to move forward is thereby reduced. Thus, if the drive force on the left wheel becomes larger than the drive force on the right wheel, a turning force is generated that turns the vehicle to the right. The collinear graph of the drive force distribution apparatus of the present embodiment corresponding to such a turning state is as shown in graph (b) in FIG. 1. As is clear from this collinear graph (b), the left-wheel rotational velocity Vl from the carrier 115c is larger than the right-wheel rotational velocity Vr from the carrier 116c.

The difference in drive force on the left and right wheels can be continuously increased in proportion to the magnitude of the torque of the motor/generator 122 in the same direction as the rotation of the engine. In other words, the distribution of drive force to the left and right wheels is not related to the rotational velocity output to the left and right wheels (the vehicle speed) or to the relative magnitudes of the rotational velocities of the left and right wheels and can be freely controlled by the torque output from the motor/generator 122.

In a state wherein the distribution of drive force to the left and right wheels is 50:50, the motor/generator 122 is driven so that a torque is output in the direction opposite to the rotation of the engine. The control pinion 121 therefore receives the torque and rotates in the direction opposite to the rotation of the engine via the motor-output shaft 122a. The ring gear 116r thereby receives a torque that causes rotation in the same direction as the rotation of the engine.

Meanwhile, the motor-output shaft 122a, which is driven in the direction opposite to the rotation of the engine, transmits a torque that causes the control pinion 120 to rotate in the same direction as the rotation of the engine via the control-pinion shaft 121a, the middle pinions 124 and 125, and the control pinion shaft 120a. The control pinion 120 then transmits such torque to the ring gear 115r, causing the ring gear 1115r to rotate in the direction opposite to the rotation of the engine.

Thus, a torque that causes rotation in the direction opposite to the rotation of the engine is provided to the ring gear 115r in such instances. This torque is transmitted to the carrier 115c and acts to cause the left wheel to move backward. The drive force on the left wheel is thereby reduced. A torque that causes rotation in the same direction as the rotation of the engine is provided to the ring gear 116r. This torque is transmitted to the carrier 116c and acts to cause the right wheel to move forward. The drive force on the right wheel is thereby increased.

Thus, if the drive force on the right wheel becomes larger than the drive force on the left wheel, a turning force is generated that turns the vehicle to the left. The collinear graph of the drive force distribution apparatus of the present embodiment corresponding to such a turning state is as shown in graph (c) in FIG. 11. As is clear from this collinear graph (c), the left-wheel rotational velocity Vl from the carrier 115c is smaller than the right-wheel rotational velocity Vr from the carrier 116c.

The difference in drive force on the left and right wheels can be continuously increased in proportion to the magnitude of the torque of the motor/generator 122 in the direction opposite the rotation of the motor.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A drive force distribution apparatus comprising:
   an input shaft having a drive force receiving end and an output end;
   first and second output shafts disposed parallel to the input shaft;
   a first epicyclic gear group having two degrees of freedom, with the first epicyclic gear group including a first gear mounted on the input shaft, a second gear coupled to the first output shaft through a carrier of the first epicyclic gear group, and a third gear which is a ring gear, with the carrier of the first epicyclic gear group being disposed on a first axial side of the first gear of the first epicyclic gear group that is opposite from a second axial side of the first gear of the first epicyclic gear group where the drive force receiving end is disposed;
   a second epicyclic gear group having two degrees of freedom, with the second epicyclic gear group including a first gear mounted on the input shaft, a second gear coupled to the second output shaft through a carrier of the second epicyclic gear group, and a third gear which is a ring gear, with the carrier of the second epicyclic gear group being disposed on a first axial side of the first gear of the second epicyclic gear group that is opposite from a second axial side of the first gear of the second epicyclic gear group where the first epicyclic gear group is disposed, the drive force receiving end of the input shaft being disposed on the first axial side of the first gear of the second epicyclic gear group;
   a motor-output transmission system including
      first and second control pinions engaged with the third gears of the first and second epicyclic gear groups, respectively, such that the first control pinion is engaged with only the third gear of the first epicyclic gear group and the second control pinion is engaged with only the third gear of the second epicyclic gear group,
      a first pinion shaft fixed to the first control pinion to rotate therewith,
      a second pinion shaft fixed to the second control pinion to rotate therewith, the first and second control pinions being disposed on the first and second pinion shafts, respectively, and
      first and second middle pinions engaging each other, with the first middle pinion fixed to the first pinion shaft and the second middle pinion fixed to the second pinion shaft; and
   a motor/generator operatively coupled to the third gears of the first and second epicyclic gear groups so that mutually different drive forces are transmitted from the motor/generator to the first and second epicyclic gear groups, the motor/generator being attached to the first pinion shaft to rotate the first pinion shaft.

2. The drive force distribution apparatus according to claim 1, wherein
the motor-output transmission system is connected to the motor/generator to transmit a torque from the motor/generator to rotate the third gears of the first and second epicyclic gear groups in mutually opposite directions via the first and second control pinions and the first and second middle pinions.

3. The drive force distribution apparatus according to claim 1, wherein
the first gears of the first and second epicyclic gear groups are both configured as sun gears that are coaxially arranged.

4. The drive force distribution apparatus according to claim 1, wherein
the first and second gears of the first and second epicyclic gear groups have identical gear ratios; and
the second and third gears of the first and second epicyclic gear groups have identical gear ratios.

5. The drive force distribution apparatus according to claim 1, wherein
the second gears of the first epicyclic gear group are configured as a plurality of first planet gears; and
the second gears of the second epicyclic gear group are configured as a plurality of second planet gears.

6. The drive force distribution apparatus according to claim 5, wherein
the first epicyclic gear group further includes a first carrier that rotatably supports the first planet gears together with the first carrier being operatively connected to the first output shaft to rotate therewith; and
the second epicyclic gear group further includes a second carrier that rotatably supports the second planet gears together with the second carrier being operatively connected to the second output shaft to rotate therewith.

7. The drive force distribution apparatus according to claim 1, wherein
the third gears of the first and the second epicyclic gear groups are coupled to the motor/generator to be rotated by the motor/generator to control a difference in rotational velocities of the first and second output shafts that are connected to the second gears of the first and second epicyclic gear groups, respectively.

8. The drive force distribution apparatus according to claim 7, wherein
the motor/generator is configured to generate electricity when limiting rotation of the third gears of the first and the second epicyclic gear groups to limit the difference in rotational velocities of the two output shafts.

9. A drive force distribution apparatus comprising:
first differential means for providing two degrees of freedom to transmit a drive force from an input shaft to a first output shaft, the input shaft having a drive force receiving end and an output end;
second differential means for providing two degrees of freedom to transmit the drive force from the input shaft to a second output shaft, the first and second output shafts being disposed parallel to the input shaft;
torque providing means for providing a torque for distribution of the drive force from the input shaft to the first and second output shafts,
each of the first and second differential means including first rotational transmitting means for transmitting the drive force from the input shaft with the first rotational transmitting means mounted on the input shaft, second rotational transmitting means for selectively outputting the drive force to a respective one of the first and second output shafts through a respective carrier, and a ring gear for receiving the torque in mutually opposite directions from the torque providing means,
with the carrier of the first differential means being disposed on a first axial side of the first rotational transmitting means of the first differential means that is opposite from a second axial side of the first rotational transmitting means of the first differential means where the drive force receiving end is disposed, and with the carrier of the second differential means being disposed on a first axial side of the first rotational transmitting means of the second differential means that is opposite from a second axial side of the first rotational transmitting means of the second differential means where the first differential means is disposed, the drive force receiving end of the input shaft being disposed on the first axial side of the first rotational transmitting means of the second differential means; and
conversion means for converting the torque for controlling distribution of the drive force into the opposite directions between the third gears of the first and second differential means, the conversion means including
first and second control pinions engaged with the third gears of the first and second differential means, respectively, such that the first control pinion is engaged with only the third gear of the first differential means and the second control pinion is engaged with only the third gear of the second differential means,
a first pinion shaft fixed to the first control pinion to rotate therewith,
a second pinion shaft fixed to the second control pinion to rotate therewith, the first and second control pinions being disposed on the first and second pinion shafts, respectively, and
first and second middle pinions engaging each other, with the first middle pinion fixed to the first pinion shafts and the second middle pinion fixed to the second pinion shaft,
with the torque providing means being attached to the first pinion shaft to rotate the first pinion shaft.

10. The drive force distribution apparatus according to claim 9, wherein
the torque providing means further comprises rotation limiting means for limiting rotation in mutually opposite directions of the third rotational transmitting means of the first and second differential means and limiting a difference in rotational velocity between the second rotational transmitting means of the first and second differential means.

11. A method for distributing drive force comprising:
providing an input shaft having a drive force receiving end and an output end;
providing first and second output shafts disposed parallel to the input shaft;
providing a first differential unit with two degrees of freedom using a first element mounted on the input shaft, a second element and a third element which is a ring gear, with the second element of the first differential unit being coupled to the first output shaft through a carrier of the first differential unit, the carrier of the first differential unit being disposed on a first axial side of the first element of the first differential unit that is opposite from a second axial side of the first element of the first differential unit where the drive force receiving end is disposed;

providing a second differential unit with two degrees of freedom using a first element mounted on the input shaft, a second element and a third element which is a ring gear, with the second element of the second differential unit being coupled to the second output shaft through a carrier of the second differential unit, the carrier of the second differential unit being disposed on a first axial side of the first element of the second differential unit that is opposite from a second axial side of the first element of the second differential unit where the first differential unit is disposed, the drive force receiving end of the input shaft being disposed on the first axial side of the first element of the second differential unit;

providing a motor-transmission system with
- first and second control pinions engaged with the third elements of the two differential units, respectively, such that the first control pinion is engaged with only the third element of the first differential unit and the second control pinion is engaged with only the third element of the second differential unit,
- a first pinion shaft fixed to the first control pinion to rotate therewith,
- a second pinion shaft fixed to the second control pinion to rotate therewith, the first and second control pinions being disposed on the first and second pinion shafts, respectively, and
- first and second middle pinions engaging each other, with the first middle pinion fixed to the first pinion shaft and the second middle pinion fixed to the second pinion shaft;

inputting a drive force transmitted from an input shaft to the first elements of the two differential units;

distributing the drive force to a pair of output shafts via the second elements of the first and second differential units; and providing a torque for controlling distribution of the drive force in a direction so that the third elements of the two differential units rotate in mutually opposite directions to selectively increase the drive force that is distributed to one of the output shafts and reduce the drive force distributed to the other of the output shafts, the torque being provided to the first pinion shaft to rotate the first pinion shaft.

* * * * *